(12) United States Patent
Zeng

(10) Patent No.: US 9,332,154 B2
(45) Date of Patent: May 3, 2016

(54) IMAGE BINARIZATION USING DYNAMIC SUB-IMAGE DIVISION

(71) Applicant: IMDS AMERICA INC., Montreal (CA)

(72) Inventor: Yijun Zeng, Montreal (CA)

(73) Assignee: IMDS AMERICA INC., Montreal, Quebec (CA)

( * ) Notice: Subject to any disclaimer, the term of this patent is extended or adjusted under 35 U.S.C. 154(b) by 0 days.

(21) Appl. No.: 14/225,035

(22) Filed: Mar. 25, 2014

(65) Prior Publication Data

US 2014/0205200 A1    Jul. 24, 2014

Related U.S. Application Data

(63) Continuation-in-part of application No. 12/356,945, filed on Jan. 21, 2009, now abandoned.

(60) Provisional application No. 61/006,517, filed on Jan. 17, 2008.

(51) Int. Cl.
*H04N 1/403* (2006.01)
*G06K 9/32* (2006.01)
*G06K 9/38* (2006.01)

(52) U.S. Cl.
CPC .............. *H04N 1/403* (2013.01); *G06K 9/3258* (2013.01); *G06K 9/38* (2013.01); *G06K 2209/01* (2013.01); *G06K 2209/15* (2013.01)

(58) Field of Classification Search
None
See application file for complete search history.

(56) References Cited

U.S. PATENT DOCUMENTS

| 7,085,003 B1 * | 8/2006 | Belkhir ........................... 358/1.9 |
| 8,411,112 B1 * | 4/2013 | Ainslie et al. .................. 345/629 |
| 2002/0114010 A1 | 8/2002 | Haltmaier ..................... 358/2.1 |
| 2006/0120602 A1 * | 6/2006 | Tang et al. ..................... 382/176 |

* cited by examiner

*Primary Examiner* — Mohammad Ghayour
*Assistant Examiner* — Christopher D Wait
(74) *Attorney, Agent, or Firm* — Equinox IP; Franz Bonsang

(57) ABSTRACT

Image binarization method and device for converting a grayscale image into a black and white binary image are provided. The grayscale image is divided into sub-images dynamically created from pixel to pixel containing a given pixel as well as neighboring pixels. A threshold for each pixel is determined based on the color values of all the pixels in the sub-image. Therefore, at a certain color value, this given pixel is converted to white and at another color value the pixel is converted black. The foregoing is effectuated pixel by pixel in a dynamic fashion evaluating each pixel relative to its neighboring pixels in order to produce a binary image.

22 Claims, 15 Drawing Sheets

Original ┃ 7947 ZA 35 ┃

Binarized ┃ 7947 ZA 35 ┃

FIG. 1 *(Prior Art)*

Original ┃ 819 BDN 78 ┃ ← rpo
         ↑ Ipo

Binarized ┃ 819 BDN ▇ ┃ ← rbp

FIG. 2 *(Prior Art)*

A ↘    ↙ B
┃ 819 BDN 78 ┃

FIG. 3 *(Prior Art)*

Pixel $P_1$ — Subl $P_1$
┃ 819 BDN 78 ┃ — Subl $P_2$
         Pixel $P_2$

FIG. 4

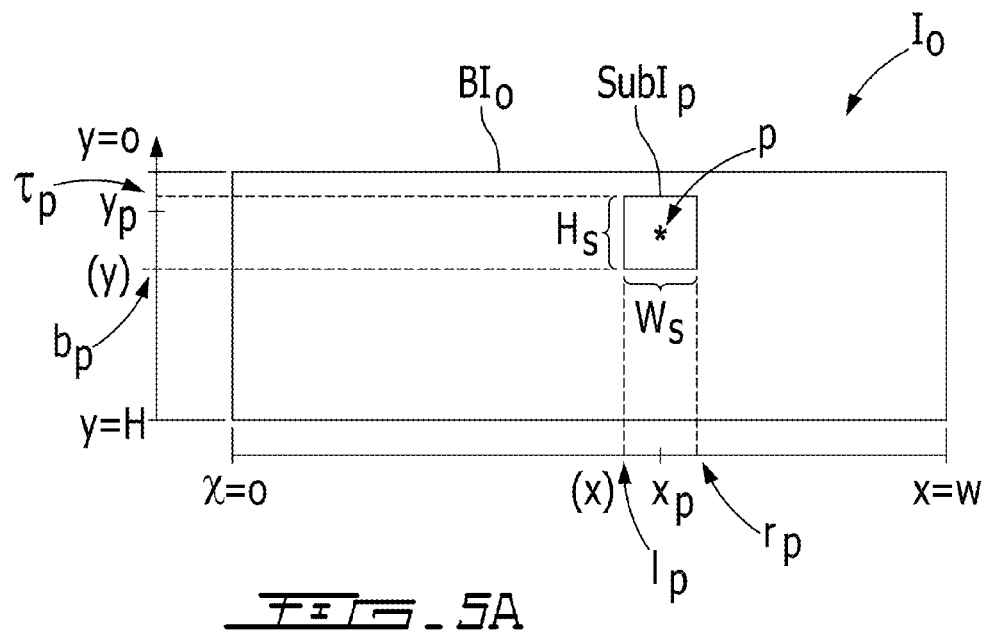
FIG_5A
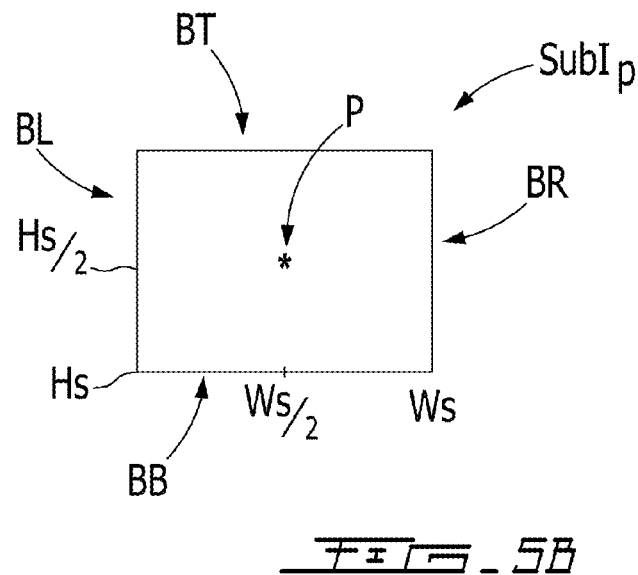
FIG_5B

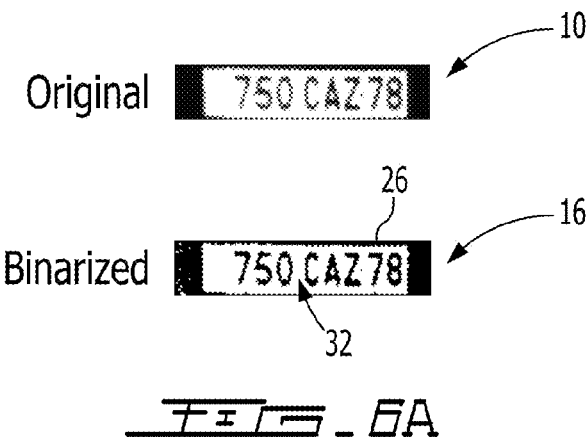
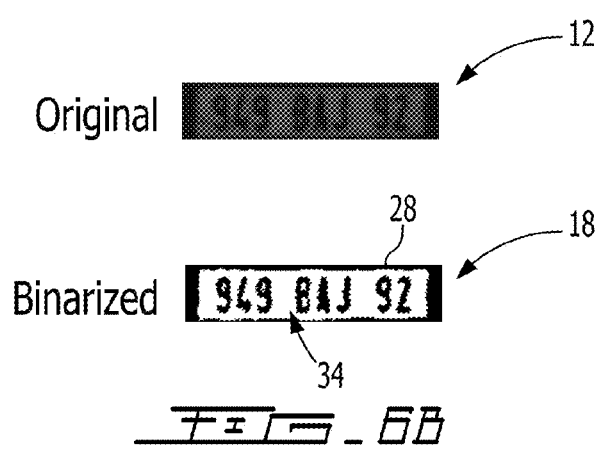
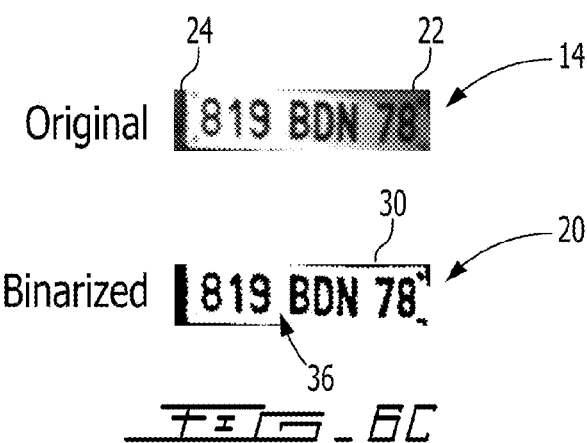

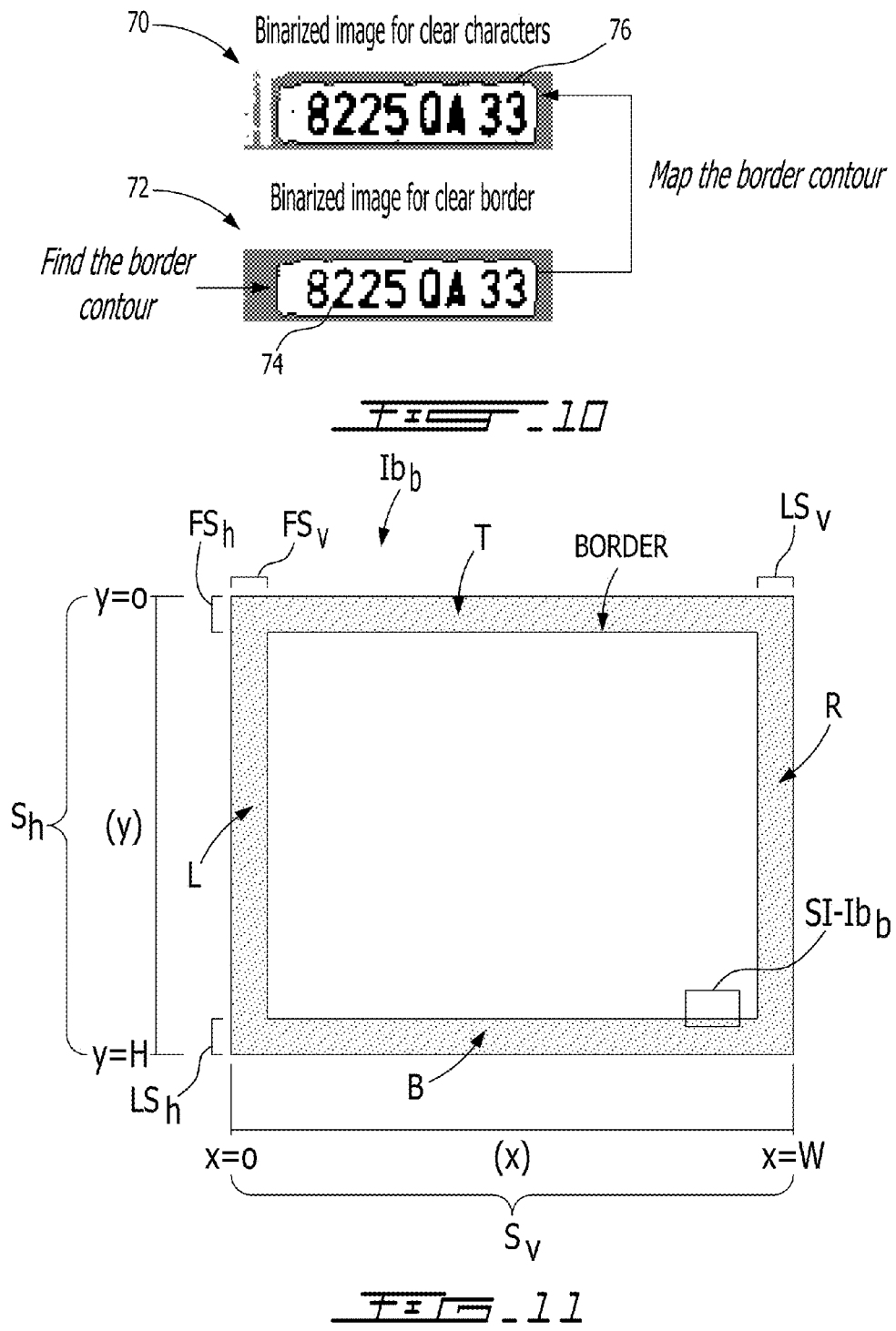

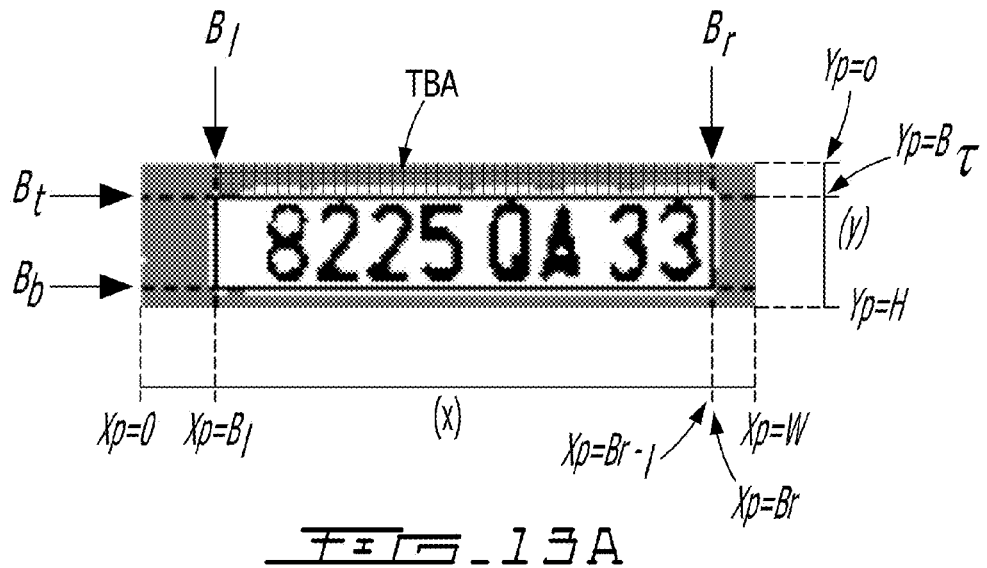
FIG_13A
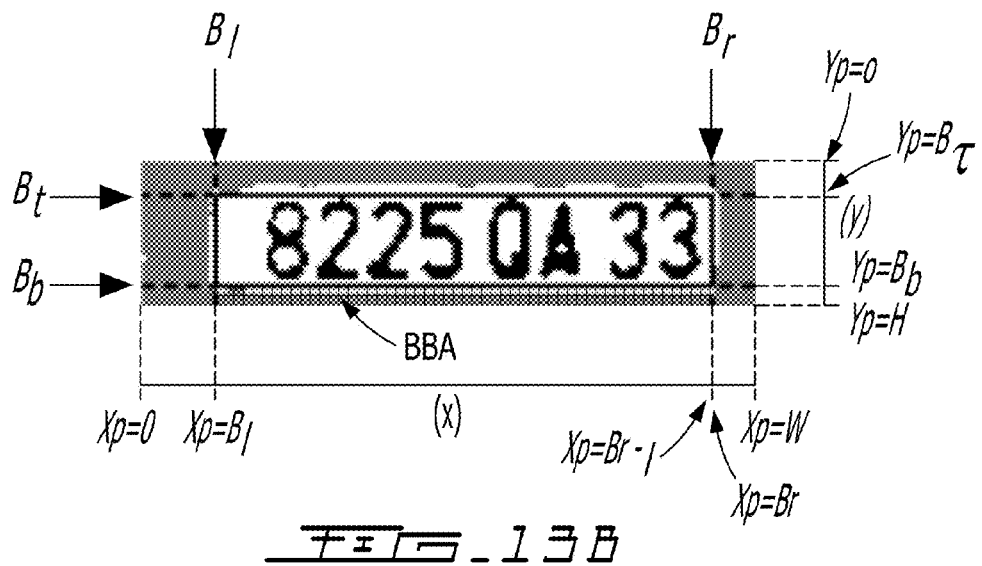
FIG_13B

FIG. 18
FIG. 19

FIG_20C
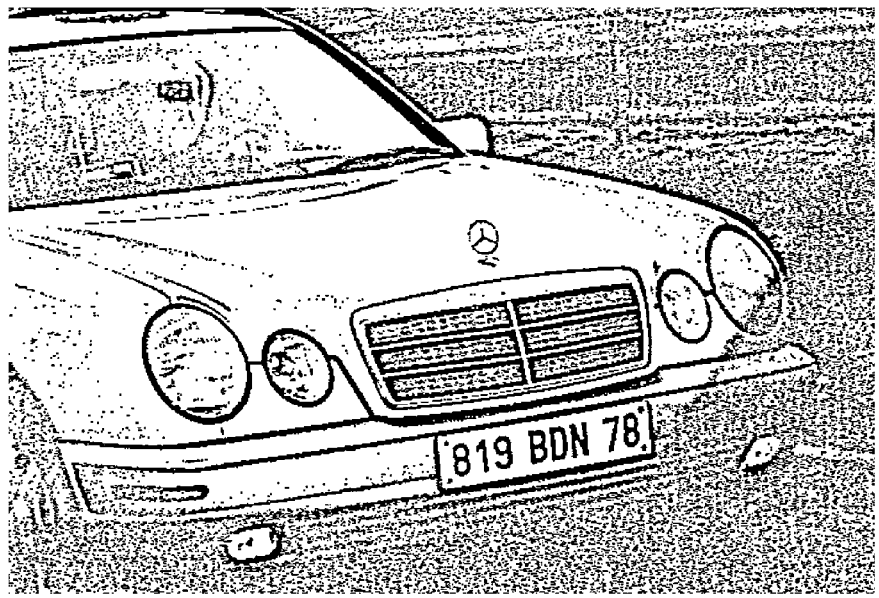
FIG_20D

 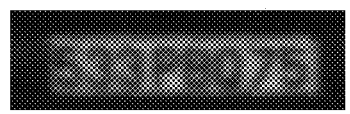
 
FIG_24
 — 200
 — 202
 — 204
FIG_25

IMAGE BINARIZATION USING DYNAMIC SUB-IMAGE DIVISION

CROSS-REFERENCE TO RELATED APPLICATIONS

This application claims priority based on provisional application No. 61/006,517 filed on Jan. 17, 2008, and is a continuation-in-part of US patent application Ser. No. 12/356,945 filed on Jan. 21, 2009, which are herein incorporated by reference.

TECHNICAL FIELD

The present disclosure relates to image binarization. More specifically, but not exclusively, the present disclosure relates to image binarization using dynamic sub-image division.

BACKGROUND

Image binarization converts an image of gray levels (grayscale) to a black and white image. The simplest way to use image binarization is to choose a threshold value, and classify all pixels with values above this threshold as white, and all other pixels as black. The problem then is how to select the correct threshold. In many cases, finding one threshold compatible to the entire image is very difficult, and sometimes even impossible. Therefore, adaptive image binarization is needed where an optimal threshold is chosen for each image area. When a different threshold can be used for different regions in the image, this is known as adaptive thresholding or as local or dynamic thresholding [see Pierre D. Wellner, "*Adaptive Thresholding for the Digital Desk*", http://www.xrce.xerox.com/publis/cam-trs/pdf/1993/epc-1993-110.pdf.]

Image binarization is a useful process in a variety of different fields such as public safety for example.

In many public sites, such as parking lots, street intersections, highways, surveillance cameras are installed for public safety purposes or management. The installed cameras produce a huge number of images with important information. It is therefore critical to provide an effective method for precisely and rapidly retrieving this information from the images. Often, at sites where surveillance cameras take images, the luminance is usually uneven on the objects in the images making it difficult in producing a binarized image of good quality.

Optical character recognition or OCR methods, which work on a 1-bitimage, are useful in retrieving information from images. The images provided by the surveillance cameras may seem black and white to the naked eye but in fact they are in grayscale. Binarizing the images taken by the cameras to be 1-bit is a key step for OCR to precisely retrieve information from the images.

Binarizing a grayscale image converts for example an 8-bit grayscale image into a 1-bit black and white image. The key here is to determine during conversion whether a pixel on the original image should be converted to be black or white.
Converting to a Grayscale Pixel to a Black or White Pixel In an example of a grayscale image, pixels are represented by an 8-bit set. The value of an 8-bit set is in the range [0, 255], which indicates the color depth of pixels. For a 1-bit image, its pixels are represented by 1 bit. Therefore, a pixel of a 1-bit image has only two possible color values, either 0 or 1.

To binarize a grayscale image to a corresponding binary image, we need a color value called a threshold to determine whether a pixel in the original image should be converted to a black or white pixel in its corresponding binary image. In essence we assign a color value to the pixel: 0 (white) or 1 (black). Global threshold Using a single threshold for all pixels in a grayscale image, (e.g. global threshold), to binarize a grayscale image is the simplest way. FIG. 1 shows the result (Binarized) of binarization of a grayscale car plate image (Original) using a global threshold to assign a black or white color value to each pixel. The original image is evenly lit and as such provides a good binarized image.

Yet, in most cases and especially in sites under surveillance, photographed objects are not properly or evenly lit and thus do not provide clear images.

FIG. 2 shows the binarized result (Binarized) of a grayscale image (Original) of an unevenly lit car plate using again a global threshold. In the right-hand portion (rpo) of the original image the color of the background is almost as dark as foreground of the left-hand portion (Ipo) of the original image. Thus, the right-hand portion (rpb) of the binarized image becomes black and unrecognizable even if the background and foreground in the right-hand portion of the original image is distinguishable to the naked eye.

The above unacceptable result is due to uneven luminance on the car plate when the surveillance camera captured this image. When binarizing such an image with a global threshold, the background pixels in the right-hand portion are too dark and as such their color value is lesser than the global threshold, thus these pixels are assigned the color value 1 and the resulting background in the right-hand portion of the binarized image is converted to black.
Adaptive Thresholding Since the use of a global threshold does not provide a binarized image of sufficient quality, using different thresholds in different parts of the image to be binarized is used to binarize an unevenly lit image. This is called adaptive thresholding and it is a commonly used method of image binarization.

As shown in FIG. 1, images with even luminance are easy to handle and the result of binarization on such images is satisfactory. The basic idea of adaptive thresholding is to divide the image to be binarized into sub-images. The sub-image should be small enough so that each one can be considered as being evenly lit. But the sub-images should also be big enough to contain sufficient information.

As shown in FIG. 3, to distinguish whether a pixel is in the background or the foreground, the value of the threshold for the sub-image A must be different from that of for the sub-image B. In this case, we need to take special care of the pixels crossing the border between two sub-images. There should be a smooth transition from one sub-image to another of the threshold value of the pixels across a border between the two sub-images. The foregoing is difficult to achieve with known techniques. One attempt of solving this problem is interpolation which is used to smoothen the threshold across the border between sub-images as described in K. Castleman, "*Digital Image Processing*", Prentice-Hall Signal Processing Series, 1979. But the interpolation is just an approximation; it does not really indicate how the luminance on the object smoothly transits from a point to another.

A drawback of known methods of binarization is that they do not provide satisfactory images with sufficient detail in a timely fashion.

SUMMARY

An object of the present disclosure is to provide an image binarization method using dynamic sub-image division.

In accordance with an aspect of the present disclosure there is provided a method of binarizing a grayscale image into a black and white binary image, said method comprising;

selecting a given pixel (P) in the grayscale image;
determining the color value ($V_P$) of P;
providing a sub-image ($SubI_P$) comprising P as well as a number of neighboring pixels;
providing a threshold ($T_P$) of P based on the color values of all the pixels in $SubI_P$;
converting P to black if $V_P \leq T_P$ or to white if $V_P > T_P$;
repeating the above steps for each pixel of the grayscale image; and
obtaining a resulting black and white binarized image.

In accordance with another aspect of the present disclosure there is provided a method of binarizing a grayscale image as above, wherein the number of pixels in each $SubI_P$ is set by performing the steps of the method on a representative sample set of grayscale images with various values of $SubI_P$ in the range 0.5 to 1.5 times the average character size of the representative sample set of grayscale images.

In accordance with yet another aspect of the present disclosure there is provided a method of binarizing a grayscale image as above, wherein $T_P$ is calculated by:

determining the average color value (Ap) of all the pixels in $SubI_P$; and
multiplying Ap by a threshold coefficient (C) to get $T_P$.

In accordance with a further aspect of the present disclosure there is provided a method of binarizing a grayscale image as above, wherein C is determined by performing the steps of the method on a representative sample set of grayscale images with various values of C in a range of 0.8 to 1.2 in order to determine an optimal value of C.

In accordance with a still further aspect of the present disclosure there is provided a method of binarizing a grayscale image as above, wherein $T_P$ is calculated by:

separating all pixels in $SubI_P$ into a first cluster and a second cluster based on their color value using a two-means clustering algorithm;
calculating means of the color value of the pixels in the first cluster ($M_{C1}$) and in the second cluster ($M_{C2}$); and
calculating the mean of $M_{C1}$ and $M_{C2}$ to get $T_P$.

In accordance with an aspect of the present disclosure there is provided a device for binarizing a grayscale image into a black and white binary image, said device comprising;

an input for receiving the grayscale image; and
a controller operatively connected to the input, the controller being so configured so as to perform the steps of:
  selecting a given pixel (P) in the grayscale image;
  determining the color value ($V_P$) of P;
  providing a sub-image ($SubI_P$) comprising P as well as a number of neighbouring pixels;
  providing a threshold ($T_P$) of P based on the color values of all the pixels in $SubI_P$;
  converting P to black if $V_P \leq T_P$ or to white if $V_P > T_P$;
  repeating the above steps for each pixel of the grayscale image; and
  providing a resulting black and white binarized image.

In accordance with another aspect of the present disclosure there is provided a device for binarizing a grayscale image as above, wherein the number of pixels in each $SubI_P$ is set by performing the controller steps on a representative sample set of grayscale images with various values of $SubI_P$ in the range 0.5 to 1.5 times the average character size of the representative sample set of grayscale images.

In accordance with yet another aspect of the present disclosure there is provided a device for binarizing a grayscale image as above, wherein $T_P$ is calculated by:

determining the average color value (Ap) of all the pixels in $SubI_P$; and
multiplying Ap by a threshold coefficient (C) to get $T_P$;
wherein C is determined by performing the controller steps on a representative sample set of grayscale images with various values of C in a range of 0.8 to 1.2 in order to determine an optimal value of C.

In accordance with a further aspect of the present disclosure there is provided a device for binarizing a grayscale image as above, wherein $T_P$ is calculated by:

separating all pixels in $SubI_P$ into a first cluster and a second cluster based on their color value using a two-means clustering algorithm;
calculating means of the color value of the pixels in the first cluster ($M_{C1}$) and in the second cluster ($M_{C2}$); and
calculating the mean of $M_{C1}$ and $M_{C2}$ to get $T_P$.

Other objects, advantages and features of the present disclosure will become more apparent upon reading of the following non-restrictive description of non-limiting illustrative embodiments thereof, given by way of example only with reference to the accompanying drawings.

BRIEF DESCRIPTION OF THE FIGURES

In the appended drawings, where like reference numerals denote like elements throughout and in where;

FIG. 1 shows a grayscale image of an evenly lit car plate and its corresponding binarized image obtained by using the prior art global threshold method;

FIG. 2 shows an grayscale image of an unevenly it car plate and its corresponding binarized image obtained by using the prior art global threshold method;

FIG. 3 shows a grayscale image divided into sub-images for binarization in accordance with the prior art adaptive threshold method;

FIG. 4 shows a grayscale image when divided by dynamic sub-image division in accordance with a non-restrictive illustrative embodiment of the present disclosure;

FIG. 5A is a schematic representation of a grayscale image and the sub-image of a pixel of this grayscale image obtained with dynamic sub-image division in accordance with a non-restrictive illustrative embodiment of the present disclosure;

FIG. 5B is an enlarged view of the sub-image of FIG. 5A;

FIGS. 6A, 6B and 6C are examples of grayscale images and their corresponding binarized images having been obtained with dynamic sub-image division in accordance with a non-restrictive illustrative embodiment of the present disclosure;

FIG. 10 shows two binarized images obtained from the grayscale image of FIG. 7 for clear characters and for a clear border respectively with dynamic sub-image division in accordance with a non-restrictive illustrative embodiment of the present disclosure;

FIG. 11 is a schematic theoretical representation of a binarized image obtained for a clear border;

FIGS. 13A, 13B, 130 and 13D shows four of the same binarized image obtained for a clear border with the border positions thereof being identified;

FIGS. 17A, 17B and 170 are the examples of grayscale images and their corresponding binarized images shown in FIGS. 6A, 6B and 6C respectively with additional corresponding binarized images having had their black borders removed;

FIG. 18 is an example of the grayscale image of FIG. 7 and its corresponding binarized image having been obtained with dynamic sub-image division for clear characters as well as its corresponding binarized image of FIG. 8 having been obtained for a clear border with an additional binarized image having had the black border removed;

FIG. 19 is an example of the grayscale image of FIG. 9 and its corresponding binarized image having been obtained with dynamic sub-image division for clear characters as well as its corresponding binarized image having been obtained for a clear border with an additional binarized image having had the black border removed;

FIGS. 20B, 20C and 20D are respective binarized images of the grayscale image of FIG. 20A having been obtained with different sub-image sizes;

FIG. 24 shows examples of a grayscale images with characters that are very small and with a very small contrast of foreground and background as well as their respective resulting binarized images; and FIG. 25 is an example of a grayscale image and two corresponding binarized images having been obtained using different sub-image sizes.

DETAILED DESCRIPTION OF ILLUSTRATIVE EMBODIMENTS

Figure 7:
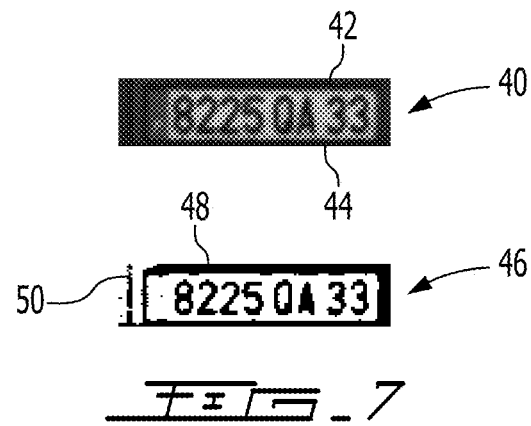
FIG. 7 shows a grayscale image and its corresponding binarized image obtained for clear characters with dynamic sub-image division in accordance with a non-restrictive illustrative embodiment of the present disclosure.

Generally stated, in an embodiment of the disclosure, an image binarization method is provided for converting a grayscale photograph or video image into a black and white binary image that provides sufficient detail.

This method divides the original image into sub-images. Instead of simply statically dividing a grayscale image into a predetermined set of sub-images, a given sub-image is dynamically created from pixel to pixel. More specifically, each sub-image is a window that contains a central first pixel as well as neighboring pixels. The next sub-image will contain a central second pixel, adjacent to the first pixel as well as neighboring pixels and sub-mages will be created so forth from pixel to pixel. The color density or value of the neighboring pixels or of all the pixels in the sub-image is averaged and the threshold (i.e. the local contrast) between the central pixel and its neighboring pixels is calculated. A certain predetermined percentage of local contrast is used to calculate whether or not the central pixel is below or above the threshold. Therefore, at a certain color value, the pixel is converted to white and at another color value the pixel is converted black. The foregoing is effectuated pixel by pixel in a dynamic fashion evaluating each pixel relative to its neighboring pixels in order to produce a binarized image.

By using these dynamic sub-image divisions which move from one pixel to another rather than being preset, a more detailed black and white image is provided. In essence, local contrast is calculated rather than general contrast which gives a much clearer and much more precise image and would provide for a smooth threshold transition of the pixels across the border between two sub-images. The amount of neighboring pixels in a given sub-image is also predetermined. A small sub-image provides greater clarity whereas a large sub-image gives a better broad view. For example, in car plates, the small sub-image is used for reading the license number, whereas for the border a larger sub-image is used. The two binary images are combined to give a full view of the border with the plate numbers therein.

With reference to the appended drawings, a non-restrictive illustrative embodiment of the present disclosure will now be described herein so as to exemplify the disclosure and not limit the scope thereof.

Binarization with Dynamic Sub-Images

Since certain grayscale images such as car plates for example cannot be taken under the same luminance at surveillance sites, tools are required to treat these images in order to provide adequate binary images which will allow to clearly view important information such as a license plate number for example. In an illustrative embodiment, the present disclosure provides an algorithm for binarization with dynamic sub-images. The foregoing, in one example provides to binarize images for further treatment by OCR.

Scheme of the Algorithm

The algorithm of the present disclosure provides for calculating a threshold for each pixel in its own sub-image. For a given pixel P, its sub-image $SubI_P$ is a rectangular portion or window of the original grayscale image. The position of P is at the center of its sub-image $SubI_P$. The size of sub-image $SubI_P$ should be small enough so that the sub-image can be considered as with even luminance on it and should also be enough large to contain enough information.

The value of $SubI_P$ varies depending on the specific application. For example, in the case of the present illustrative embodiment, a representative sample set of grayscale images of various license plates may be used to determine the expected average character size, in pixels, then the value of $SubI_P$ may be set, for example, to anywhere from 50% to 150% of the determined expected average character size. The optimal value of $SubI_P$ may be determined, for example, by running the algorithm on the representative sample set of grayscale images with various values of $SubI_P$ in the range 0.5 to 1.5 times the determined expected average character size. It is to be understood that other ranges of values may be used depending on the geometry of the characters so as to have contrast transitions within $SubI_P$.

FIG. 4 shows an example of two pixels $P_1$ and $P_2$ of a grayscale image and their sub-images $SubI_{P1}$ $SubI_{P2}$ respectively. As shown, each pixel $P_1$ and $P_2$ is positioned at the centre of its respective sub-image $SubI_{P1}$ $SubI_{P2}$.

For the sub-image $SubI_P$ of a given pixel P, the color value of each pixel within the sub-image $SubI_P$ is determined and used to calculate threshold $T_P$. Therefore during binarization, P is converted to white if its color value is larger than $T_P$, and black if its color value is smaller than $T_P$.

In a first embodiment, the color value of each pixel within the sub-image $SubI_P$ is determined and the average color value is calculated for all pixels within this sub-image $SubI_P$. Threshold $T_P$ of pixel P is then calculated by multiplying this average color value a predetermined percentage.

In a second embodiment, all pixels in $SubI_P$ are separated into two clusters in accordance with their color value using a two-means clustering algorithm and the means of the color value of the pixels in each cluster are calculated. Threshold $T_P$ of pixel P is then calculated by averaging the two clusters' color value averages.

The Algorithm

With reference to FIGS. 5A and 5B, a grayscale image Io, that is to be binarized, has a width W and a height H. A fixed rectangle size for the sub-images $SubI_P$ of all the pixels of the image Io is predetermined. In essence, a fixed number of pixels along W of Io will be chosen to provide the width Ws of a sub-image $SubI_P$, and a fixed number of pixels along H of Io will be chosen to provide the height Hs of the sub-image $SubI_P$ (where 0<Ws≤W and 0<Hs≤H).

A given pixel P is positioned at $(x_P, y_P)$ and has a color value $V_P$. More specifically, $x_P$ is the position of P along W of Io and $y_P$ is the position of P along the height H of the image Io. The coordinates of the sub-image $SubI_P$ of pixel P are $(l_P, t_P, r_P, b_P)$. More specifically, $l_P$ is the position of the left border of sub-image $SubI_P$ along the width W of the image Io, $t_P$ is the position of top border of sub-image $SubI_P$ along the height H of the image Io, $r_P$ is the position of the right border of sub-image $SubI_P$ along the width W of the image Io, and $b_P$ is the position of the bottom side of sub-image $SubI_P$ along the height H of the image Io.

A first embodiment of the algorithm is described as follows:

Step 1: calculate the coordinates of $SubI_P$:

$$l_P = \begin{cases} 0, & \text{if } 0 \le x_P < Ws/2; \\ x_P - Ws/2, & \text{if } Ws/2 \le x_P < W - Ws/2; \\ W - Ws/2, & \text{if } W - Ws/2 \le x_P < W; \end{cases}$$

$$t_P = \begin{cases} 0, & \text{if } 0 \le y_P < Hs/2; \\ y_P - Hs/2, & \text{if } Hs/2 \le y_P < H - Hs/2; \\ H - Hs/2, & \text{if } H - Hs/2 \le y_P < H; \end{cases}$$

$$r_P = \begin{cases} Ws, & \text{if } 0 \le x_P < Ws/2; \\ x_P + Ws/2, & \text{if } Ws/2 \le x_P < W - Ws/2; \\ W, & \text{if } W - Ws/2 \le x_P < W; \end{cases}$$

$$b_P = \begin{cases} Hs, & \text{if } 0 \le y_P < Hs/2; \\ y_P + Hs/2, & \text{if } Hs/2 \le y_P < H - Hs/2; \\ H, & \text{if } H - Hs/2 \le y_P < H; \end{cases}$$

Step 2: calculate the average of the color value $A_P$ of all pixels in $SubI_P$. $A_P$=sum of the color value of each pixel in $SubI_P$/number of pixels in $SubI_P$.

Step 3: calculate the threshold $T_P$ of P: $T_P = C \times A_P$, where C is a predetermined coefficient that sets the threshold $T_P$ as a percentage of the average gray-level value of $SubI_P$. Optimally, the value for C lays around 1.0, being exactly 1.0 for a perfectly bimodal sub-image with two equal-height peaks. It should be noted that the binarization result is not overly sensitive to the exact value of C. The optimal value of C may be determined, for example, by running the algorithm on a representative sample set of grayscale images with various values of C in the range 0.8 to 1.2 (i.e. a threshold value of 80% to 120% of the average gray-level value of the sub-image).

Step 4: binarize pixel P:

$$P \text{ is } \begin{cases} \text{black}, & \text{if } V_P \le T_P; \\ \text{white}, & \text{if } V_P > T_P. \end{cases}$$

It is to be understood that threshold $T_P$ may be determined in other ways, for example in a second embodiment of the algorithm, steps 2 and 3 may be as follows:

Step 2: separate all pixels in $SubI_P$ into two clusters $C_1$ (regrouping light colored pixels) and $C_2$ (regrouping the other dark colored pixels) using a two-means clustering algorithm and calculate $M_{C1}$ and $M_{C2}$, the means of the color value of the pixels in $C_1$ and $C_2$, respectively.

Step 3: calculate the threshold $T_P$ of P: $T_P$=mean of $M_{C1}$ and $M_{C2}$.

Each of the four steps is repeated on the image Io pixel by pixel until all pixels or a desired number of pixels have been converted to either black and white thereby providing a binarized image.

P should be at the centre of $SubI_P$ where Ws/2 and Hs/2 correspond.

Therefore, it should be noted that when calculating coordinates of a sub-image $SubI_P$ in Step 1 for a given pixel P, if the distance from the position $(x_P, y_P)$ of P to the borders BL, BR, BT and BB of the image Io is less than ½ of the width Ws or height Hs of the sub-image $SubI_P$, then the center of this sub-image Sub/p does not correspond to the position of P. In this case, we align the border of the sub-image $SubI_P$ of P to the border BIo of the image Io.

Examples

What follows are a few results exemplifying the above discussed algorithm for Binarization with Dynamic Sub-images.

FIGS. 6A, 6B and 6C respectively show three car plate original grayscale images 10, 12 and 14 and their corresponding binarized images 16, 18, and 20 respectively.

Images 10, 12 and 14 were taken under very different luminance conditions. Image 10 was lit evenly. Image 12 received light that was weaker than image 10 and uneven. Image 14 received even less light. In image 12, the background is supposed to be white, but looks almost as dark as the foreground of image 10. As for image 14 which received uneven luminance, the background near its right end 22 looks almost as dark as the foreground in its left end 24.

However, when the three images 10, 12 and 14 were binarized in accordance with the present disclosure the characters in all three binarized images 16, 18 and 20 are clear enough for further treatment by OCR.

The Parameters for Binarization

As mentioned above, the factors in the algorithm of the present disclosure include the size of the sub-image $SubI_P$ and its associated threshold $T_P$.

With respect to recognizing characters in a grayscale image, in one non-limiting example, it was found that a binarization result of satisfactory quality is achieved when choosing a width and height for the sub-image that is 1.5 times the width of the determined expected average character width of a representative sample set of grayscale images. Such a sub-image size provides for the present algorithm to produce characters in the binarized images that are suitable for OCR recognition. In one example, the width of most of the image sample set characters was about 12 pixels. As such a character width of 12 pixels was set and therefore the sub-image was set with a height and width of 18 pixels (1.5 times of the character width), therefore the sub-image contains 324 pixels.

However, the binarization result is not overly sensitive to the sub-image size. For example, the width of the characters in the three images 10, 12 and 16 shown in FIG. 6 is not exactly 12 pixels, but nevertheless all the characters in the three binarized images 16, 18 and 20 are clear.

In the examples of FIGS. 6A, 6B and 6C, 0.85 was chosen as threshold coefficient C.

Algorithms for Border Removal

In FIGS. 6A, 6B and 6C, all three binarized images 14, 16 and 18 have a black border 26, 28 and 30 respectively surrounding their plate images 32, 34 and 36 respectively. For OCR, this is not optimal. Segmentation works better without such a border and as such it is preferably removed from the binarized car plate images before passing them to OCR. An example of an algorithm for border removal will now be described in accordance with a non-restrictive illustrative embodiment of the present disclosure. It is to be understood that other border removal algorithms may also be used.

Clear Characters and Clear Border

In order to remove the black border surrounding the characters in binarized images such as car plate images, or sign images and the like, the shape of the border has to be determined.

Turning to FIG. 7, the original grayscale image 40 shows a clear border 42 surrounding the plate image 44, but in the corresponding binarized image 46, the border 48 was broken into pieces at the left portion 50 of the image 46. This type of binarized image is not optimal for border removal. Therefore, we must temporally set aside our aim in pursuit of clear characters in the binarized image, to instead focus on capturing a satisfactory clear border shape.

It was mentioned above that the result of binarization is not very sensitive to the sub-image size; nevertheless, changing the size of the sub-image does affect the result. Therefore, it is advantageous to provide a larger sub-image size when binarizing the border than the sub-image size provided when binarizing the characters. For example, in FIG. 7 the sub-image size (height and width) was 1.5 times the character width which was set at 12 pixels, providing a sub-image size of 18-by-18 pixels. This sub-image size though did not provide a satisfactory border. Therefore, to properly binarize the border 42 of the grayscale image 40 of FIG. 7, a sub-image size having a width and height that was 2.5 times the character width (12 pixels) was set thereby providing a sub-image size of 30-by-30 pixels.

Figure 8:
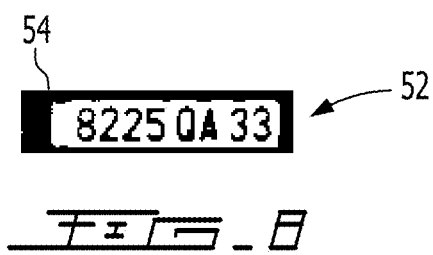
FIG. 8 shows another binarized image obtained from the grayscale image of FIG. 7 for a clear border with dynamic sub-image division in accordance with a non-restrictive illustrative embodiment of the present disclosure.

FIG. 8 shows the resulting binarized image 52 having a clear border 54. Based on such a binarized image, we detect the border in image 46 of FIG. 7. When comparing the binarized image 52 of FIG. 8 with the binarized image 46 of FIG. 7, it is ascertained that in this non-limiting example it was advantageous to binarize the grayscale plate image 30 using a sub-image size of 2.5 times the plate character width (about 12 pixels) thus providing both clear characters and a clear border.

Unfortunately, the results achieved in FIG. 8 are exceptional and most times a larger sub-image will provide a clear border but not clear characters and a smaller sub-mage will provide clear characters but not a clear border.

Therefore, in a non-restrictive illustrative embodiment of the present disclosure, a given grayscale image of a car plate or a like sign is binarized twice using two differently sized sub-images to move from pixel to pixel during the binarization step, namely a larger sub-image size and a smaller sub-image size. The binarized image produced with the larger sub-image provides for detecting the border. The binarized image produced with the smaller sub-image provides clear characters. Since the border has been detected, and more specifically, the position of the pixels that make up this border is known, this border (i.e. the pixels) can be mapped and then removed from the binarized image that provides clearer characters. Then, the two binary images are subsequently cropped to provide a complete single binary image having both a clear border and clear characters.

Figure 9:
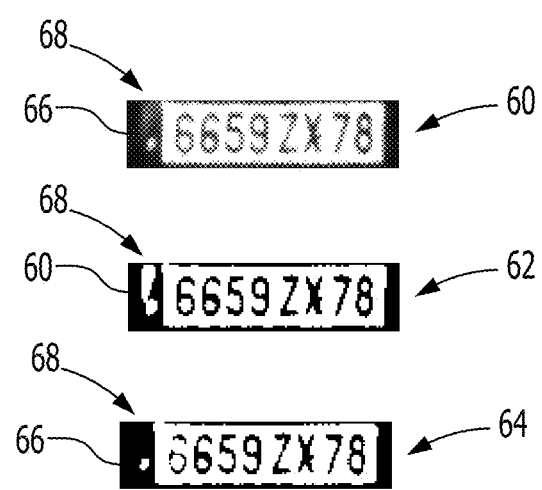
FIG. 9 shows a grayscale image and two corresponding binarized images obtained for clear characters and a clear border respectively with dynamic sub-image division in accordance with a non-restrictive illustrative embodiment of the present disclosure.

This is exemplified in FIG. 9 which shows a grayscale image 60, a first binarized image 62 and a second binarized image 64. Image 62 was obtained by binarizing the pixels of image 60 using a sub-image size of 1.5 times the character width (herein 1.5×). Image 64 was obtained by binarizing the pixels of image 60 using a sub-image size of 2.5 times the character width (herein 2.5×). Keeping in mind the character "6" and the border section 66 at the left position 68 of each of the images 60, 62 and 64, it is noted that using a sub-image size of 1.5× provides for clearer characters (as shown in image 62), whereas using a larger sub-image size (2.5×) provides for a clearer border (as shown in image 64).

Therefore image 62 (clear characters) and image 64 (clear border) should be combined to provide a complete image having both clear characters and a clear border.

Scheme for Border Removal

The algorithm for border removal comprises two binarization steps, one step for achieving clear characters (binarized image for clear characters) using a first sub-image size and the other step for achieving a clear border (binarized image for clear border) using a second sub-image size that is greater than the first sub-image size. After producing these two binarized images, the algorithm finds the border contour on the binarized image for clear border, maps the contour on the binarized image for clear characters, and then removes the border from the binarized image for clear characters. This produces a binarized image for clear characters without a border.

FIG. 10 shows two binarized images 70 and 72 which were produced from the original grayscale image 40 shown in FIG. 7. The binarized image 72 was produced using a larger sub-image size for each pixel than the one used for the binarized image 70. As such, binarized image 70 is for clear characters and binarized image 72 is for a clear border. The border contour 74 is therefore detected on image 72. The detected border contour 74 is then mapped on image 70 thereby providing a mapped contour 76. The mapped contour 76 in the binarized image 70 is removed. The image 70 without border is then cropped with the image 72 to provide an image having clear characters (that were obtained in image 70) and a clear border (that was obtained in image 72.

The Algorithms

Border removal consists of two algorithms: the algorithm for border contour finding and (b) the algorithm for border white painting. These two algorithms will now be discussed.

FIG. 11 is a schematic representation of a binarized image ($Ib_b$) which is used only for explanatory reasons regarding finding the border contour.

The Algorithm for Border Contour Finding

Let W and H be the width and height of the image. Furthermore, $S_h$ and $S_v$ indicate, respectively, the number of horizontal lines and the number of the vertical columns to be scanned, $C_h$ and $C_v$ indicate, respectively, the horizontal and vertical border density coefficients.

The following steps are performed on the binarized image for clear border.

Step 1—Binarized image for clear border: produce a binarized image for a clear border ($Ib_b$) from the original grayscale image (Io) using a pre-determined sub-image size (SI-$Ib_b$). In one non-limiting example, the sub-image size is 2.5 times the width of a given character XYZ in the original grayscale image (Io). A copy of this binarized image ($Ib_b$) is kept.

Step 2—Border scanning: in the binarized image for clear border ($Ib_b$), scan the first $S_h$ pixel lines ($FS_h$) and the last $S_h$ pixel lines ($LS_h$) to yield histograms of line black density for both the top border T and bottom border B; and scan the first $S_v$ pixel columns ($FS_v$) and the last $S_v$ pixel columns ($FS_v$) to yield histograms of column black density for both left border L and right border R.

With reference to FIGS. 12A, 12B, 12C and 12D, histograms are provided for each of the top, bottom, left and right borders. The top border and bottom borders include respective first and last pixel lines $FS_h$ and $LS_h$ respectively. The left and right borders include respective first and last pixel columns $FS_v$ and $LS_v$ respectively. We will keep the foregoing histograms in mind as we describe step 3.

Step 3—Border Position:

(i) The top border T is scanned from its top most pixel line toward its bottom most pixel line in order to identify the first pixel line that has a line black density value that is less than $W \times C_h$. Once we identify this value we determine its line number as $B_t$ and stop.

(ii) The bottom border B is scanned from its bottom most pixel line toward its top most pixel line in order to identify the first pixel line that has a line black density value that is less than $W \times C_h$. Once we identify this value we stop determine its line number as $B_b$ and stop.

(iii) The left border L is scanned from its left most pixel line toward its right most pixel line in order to identify which pixel line that has a line black density value that is less than $H \times C_v$. Once we identify this value we determine its line number as $B_l$ and stop.

(iv) The right border L is scanned from its right most pixel line toward its left most pixel line in order to identify the first pixel line that has a line black density value that is less than $H \times C_v$. Once we identify this value we determine its line number as $B_r$ and stop.

FIGS. 13A, 13B, 13C and 13D show the border position of each line number $B_t$, $B_b$, $B_l$ and $B_r$.

Step 4—Border contour: after having identified the border position line number, as we can see from FIGS. 13A-13D these positions do not exactly represent the contour of the border which is not in a straight line but in a curved line about the characters. Therefore, with particular reference to FIGS. 13A-13D, we need to identify the contour of each border side, namely the top border, the bottom border, the left border and the right border.

Figure 12A:
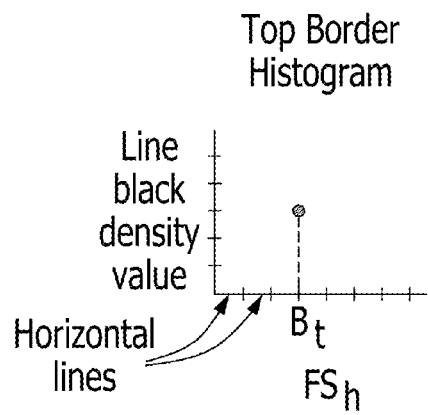
FIGS. 12A, 12B, 12C and 12D are schematic theoretical representations of line black density histograms for the top, bottom, left and right borders, respectively, of a theoretical binarized image obtained for a clear border.
Figure 14:
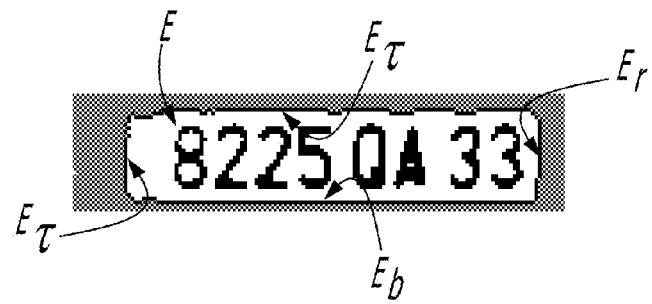
FIG. 14 shows the binarized image of FIGS. 13A-13D with the found border contour.

The top border contour: With reference to FIG. 12A, we scan every vertical pixel column from the column position $x_p = B_l$ to $x_p = B_r - 1$ within the top border area (TBA) defined from the position $y_p = B_t$ to $y_p = 0$, on each pixel column, we check each pixel position ($x_p$, $y_p$) until we identify a first black pixel, once we identify this first black pixel, we stop and move onto the next column and so one until we have identified a series of these black pixels which allows us to map out top border contour $E_t$ as shown in FIG. 14.

Figure 12B:
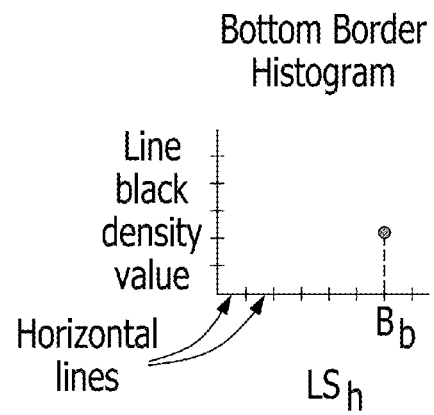

The bottom border contour: With reference to FIG. 12B, we scan every vertical pixel column from the column position $x_p = B_l$ to $x_p = B_r - 1$ within the bottom border area (BBA) defined from the position $y_p = B_b$ to $y_p = H - 1$, on each pixel column, we check each pixel position ($x_p$, $y_p$) until we identify a first black pixel, once we identify this first black pixel, we stop and move onto the next column and so one until we have identified a series of these black pixels which allows us to map out the bottom border contour $E_5$ as shown in FIG. 14.

Figure 12C:
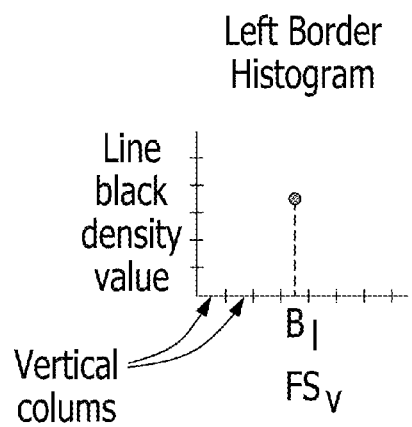

The left border contour: With reference to FIG. 12C, we scan every vertical pixel line from the line position $y_p = B_t$ to $y_p = B_b - 1$ within the left border area (LBA) defined from the position $x_p = B_l$ to $x_p = 0$, on each pixel line, we check each pixel position ($x_p$, $y_p$) until we identify a first black pixel, once we identify this first black pixel, we stop and move onto the next line and so one until we have identified a series of these black pixels which allows us to map out the left border contour $E_l$, as shown in FIG. 14.

Figure 12D:
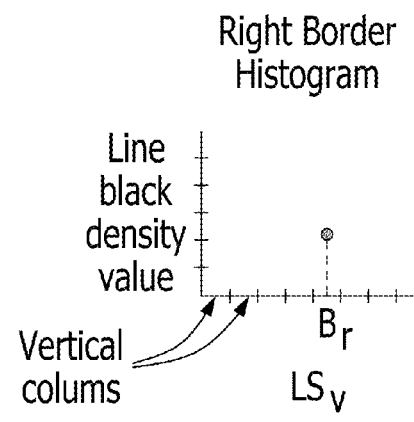

The right border contour: With reference to FIG. 12D, we scan every vertical pixel line from the line position $y_p = B_t$ to $y_p = B_b - 1$ within the right border area defined from the position $x_p = B_r$ to $X_p = W - 1$, on each pixel line, we check each pixel position ($x_p$, $y_p$) until we identify a first black pixel, once we identify this first black pixel, we stop and move onto the next line and so one until we have identified a series of these black pixels which allows us to map out the left border contour as shown in FIG. 14.

The four steps described above provide to identify the border contour E as shown in FIG. 14. The border contour consists of four sequences of pixel positions, they are the top border contour, bottom border contour, left border contour and right border contour, $E_t$, $E_b$, $E_l$, and $E_r$ respectively. The position coordinates kept in $E_t$, $E_b$, $E_l$ and $E_r$ draw a curve E.

The Algorithm for Border White Painting

Once the border contour is found, the four borders are painted white (i.e. removed).

More specifically, the border contour E that was found on the binarized image for clear border (e.g. image 72 in FIG. 10) is mapped out on the binarized image obtained for clear characters (e.g. image 70 in FIG. 10) since we have identified the coordinates of each of the pixels of $E_t$, $E_b$, $E_l$, and $E_r$ we can not find these pixels on the image obtained for clear characters and paint them white. Of course its not only the pixels of $E_t$, $E_b$, $E_l$, and $E_r$ that need to be painted white its all the pixels behind the contour (the border area see FIG. 15). Therefore border painting is performed on the image obtained for clear characters.

Figure 15:
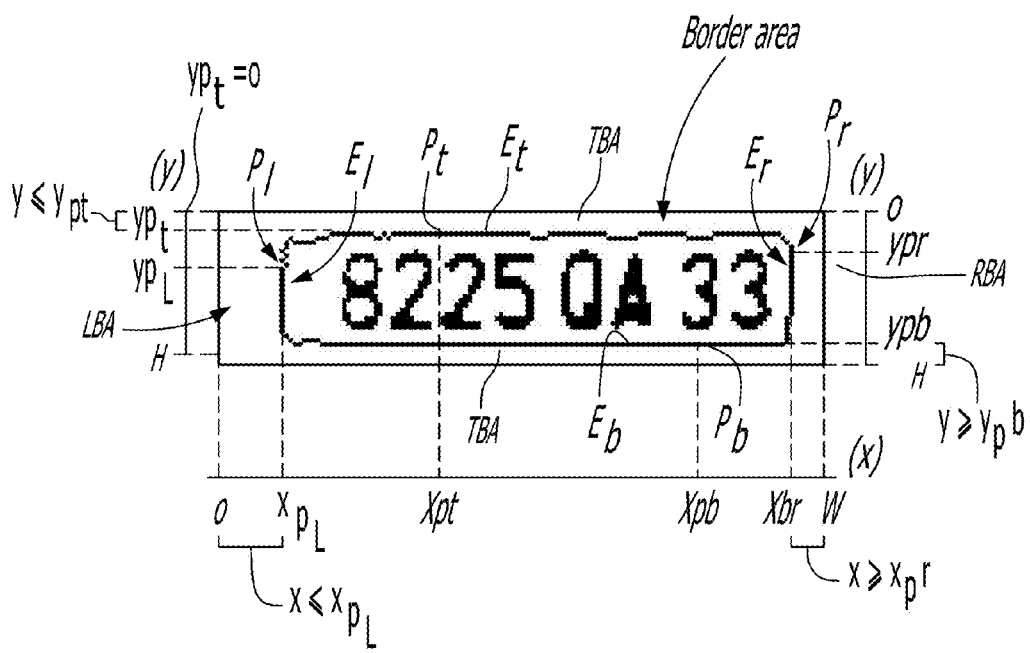
FIG. 15 is a schematic representation of another binarized image obtained for clear characters from the same grayscale image as the binarized image in FIGS. 13A-13D with the contour shown in FIG. 14 being mapped out thereon.

All the actions described below are performed in the binarized image for clear characters With reference to FIG. 15, the algorithm for border painting is described as follows:

1. The to border area (TBA): $P_t$ ($x_{pt}$, $y_{pt}$) is a given pixel in the top border contour line $E_t$, pixel $P_t$ as well as all pixels that are on the same column and above $P_t$, (pixels p(x, y) that satisfy x=$x_{pt}$ and y≤$y_{pt}$) are painted white.

2. The bottom border area (BBA): $P_b$ ($x_{pb}$, $y_{pb}$) is a given pixel in the bottom border contour line $E_b$, pixel $P_b$, as well as all pixels that are on the same column and below $P_b$, (pixels p (x, y) that satisfy $x=X_{pb}$ and $y \geq y_{pb}$) are painted white.

3. The left border area (LBA): $P_l (x_{pl}, y_{pl})$ is a given pixel in the left border contour line $E_l$, pixel $P_l$, as well all pixels that are on the same line and left of $P_l$, (pixels p(x, y) that satisfy $x \leq x_{pl}$ and $y=y_{pl}$) are painted white.

4. The right border area (RBA): $P_r$, $(X_{pr}, y_{pr})$ is a given pixel in the right border contour line $E_r$, pixel $P_r$, as well as all pixels that are on the same line and left of $P_r$, (pixels p(x, y) that satisfy $x \geq x_{pr}$ and $y=y_{pl}$ $x \leq x_{pl}$ and $y=y_{pl}$) are painted white.

Figure 13C:
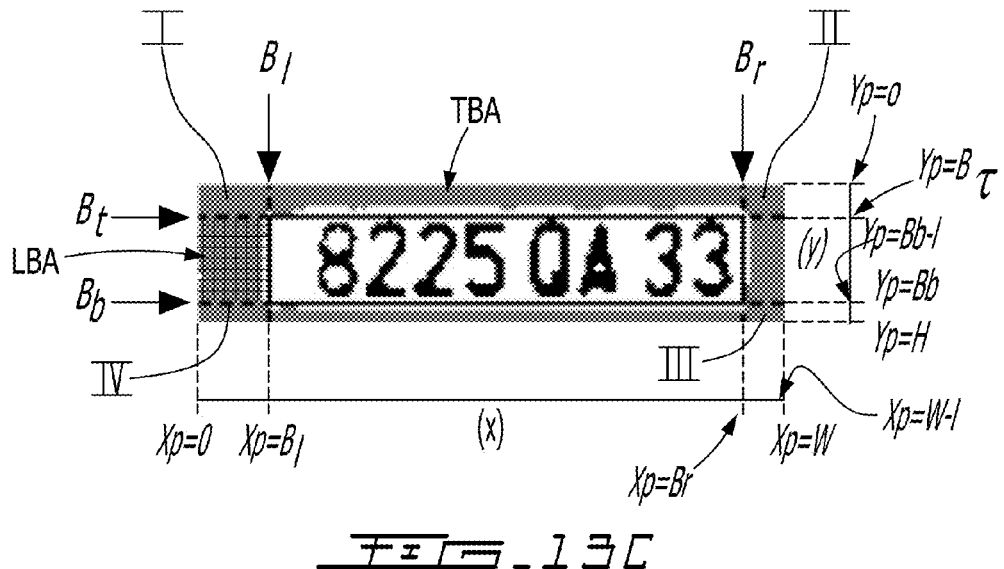
Figure 13D:
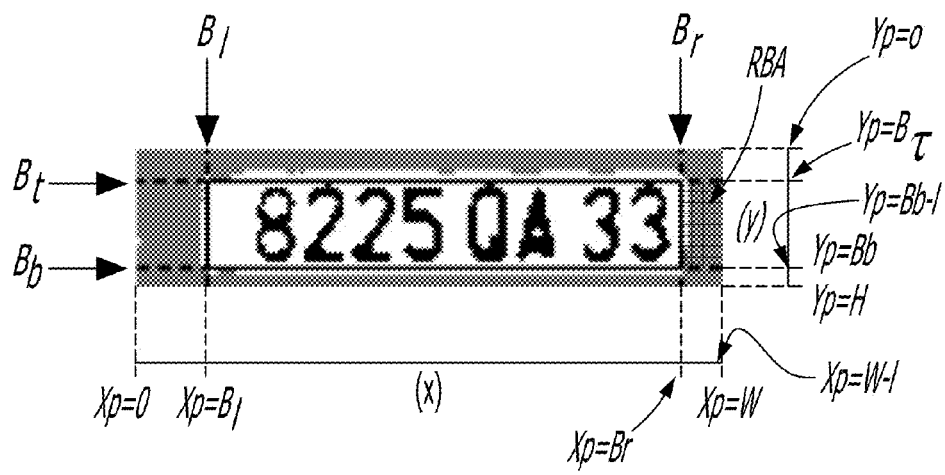

With reference to FIG. 13C, the remaining four corners I, II, III and IV are then painted white.

Figure 16:
FIG. 16 is binarized image of FIG. 15 with the border contour and border area having been removed.

With reference to FIG. 16, the foregoing provides a borderless binarized image 80 with clear characters that is cropped with a binarized image having a clear border (e.g. 72 in FIG. 10) to produce an image with both clear characters and a clear border.

Examples

Figure 17:
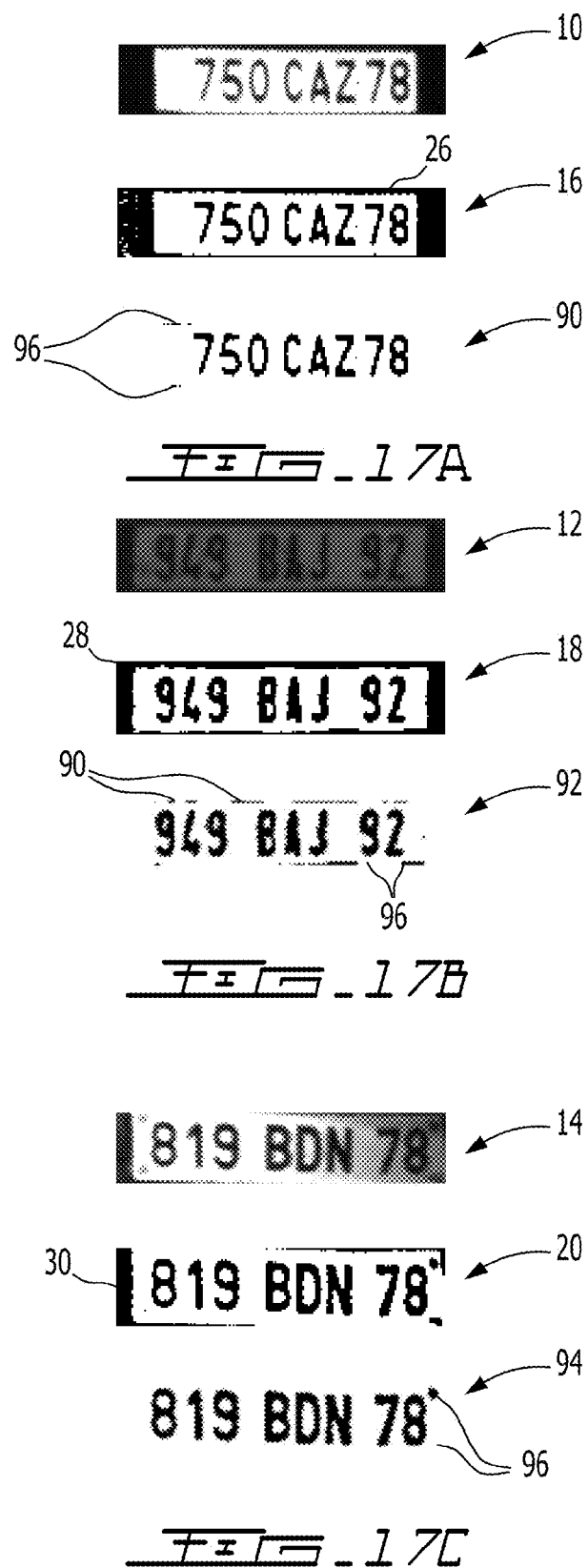

FIGS. 17A, 17B and 17O show the original grayscale images 10, 12 and 14, respectively and their binarized images 16, 18 and 20 obtained for clear characters previously discussed in FIGS. 6A-6B, FIGS. 17A, 17B and 17C show that the corresponding black borders 26, 28 and 30 can be removed from the images 16, 18 and 20 to provide corresponding images 90, 92 and 94, respectively without borders. FIGS. 17A, 17B and 17O show that the borders 26, 28 and 30 were well removed for the three car plate images. There are some dirt dots 96 on the border removed images 90, 92 and 94, which is due to the use two binarized images as previously explained. This "dirt" is just the little difference between the two binarized image versions.

FIGS. 18 and 19 show the original grayscale images 40 and 60 respectively as well as their corresponding binarized images for clear characters 46 and 62, respectively, and their corresponding binarized images for a clear borders 52 and 64 respectively all of which were previously discussed herein with reference to FIGS. 7, 8 and 9. FIGS. 18 and 19 now show that the borders of images 46 and 62 can be removed to produce images 100 and 102 respectively which have clear characters but no borders and which can be cropped with images 52 and 64 to produce images with both clear borders and clear characters.

The Parameters for Border Removal

To remove the black border in car plate images, the key procedure is to find the border contour. In the algorithm for border contour finding, we need four parameters: $S_h$, $S_v$, $C_h$, and $C_v$.

$S_h$ is the number of scanning lines for getting the black density histogram for the top and bottom border, and $S_v$ is the number of scanning columns for getting the black density histogram for the left and right border. In one embodiment, ⅓ of the image height (H) for $S_h$, and ⅓ of the image width (W) for $S_v$ are set. In another embodiment, $S_h$ is ½ of the image height (H) and $S_v$ is ½ of the image width (W).

$C_h$, and $C_v$ are constants in the algorithm. They are used to precisely locate all four borders as described in Step 3 of the algorithm for border contour finding. In one embodiment, $C_h=35\%$ and $C_v=45\%$.

For example, for top border, we scan the pixel lines, from the line 0 going down line by line, when we meet the first line (indicating Nt as its line number) which has a black density smaller than 35% of the image width (W), that means the top border consists of the pixel lines with their line number between 0 to N-1. For the bottom border we scan the pixel lines, from the line H going up line by line, when we meet the first line (Nb) which has a black density smaller than 35% of the image width (W), that means the bottom border consists of the pixel lines with their line number between H to N-1. For the left border we scan the pixel columns, from the column 0 going right column by column, when we meet the first column (Nl) which has a black density smaller than 45% of the image height (H), that means the left border consists of the pixel columns with their column number between 0 to Nl-1. For the right border we scan the pixel columns, from the column W going left line by line, when we meet the first column (Nr) which has a black density smaller than 45% of the image height (H), that means the right border consists of the pixel columns with their column number between W to Nr-1.

The values of $S_h$, $S_v$, $C_h$ and $C_v$ may be determined, for example, by running the algorithm on a representative sample set of grayscale images with various values of $S_h$, $S_v$, $C_h$ and $C_v$ in order to determine optimal values for the sample set.

Notes on the Algorithm for Binarization

Binarizing a General Grayscale Image

In the examples so far, we have seen the results of the binarization algorithm on car plate images. Of course, the method disclosed herein is also useful on other grayscale images.

Figure 20A:
FIG. 20A is an example of a grayscale image.
Figure 20B:

FIG. 20A shows an original grayscale image 110 having a width of 702 pixels and a height of 479 pixels. FIG. 20B is a first binarized image 112 of image 110 which was obtained using dynamic sub-image division with a sub-image having a size that was ¼ the image width (175 pixels) and ¼ the image height (118 pixels). FIG. 20O shows a second binarized image 114 of image 110 which was obtained using dynamic sub-image division with a sub-image having a size that was ⅛ the image width (87 pixels) and ¼ the image height (59 pixels). FIG. 20D shows a third binarized image 116 of image 110 which was obtained using dynamic sub-image division with a sub-image having a size of 10×10 pixels. Therefore, using smaller sub-images provides for more details. This is especially useful for images that were captured in the dark as is often the case with surveillance cameras.

More examples are shown in FIGS. 21A to 23B.

Figure 21A:
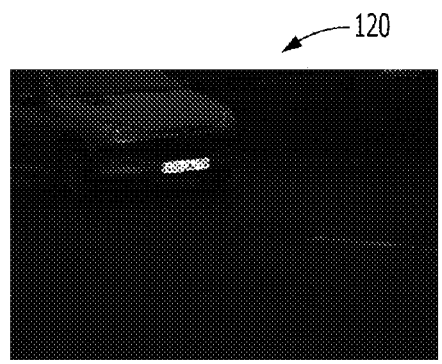
FIGS. 21A and 21B are a grayscale image and its corresponding binarized image, respectively, the latter having been obtained with dynamic sub-image division in accordance with a non-restrictive illustrative embodiment of the present disclosure.
Figure 21B:
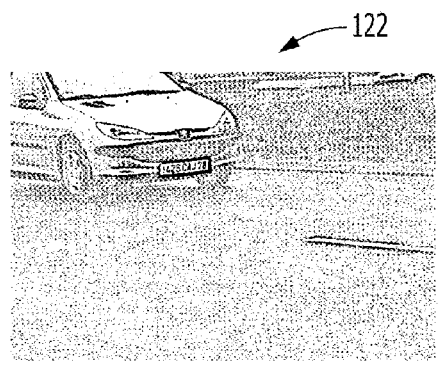

FIG. 21A shows an original grayscale image 120 having an image width of 702 pixels and an image height of 479 pixels. As is shown, image 120 is black and all that can be seen is the car plate. When binarizing image 120 with a dynamic sub image division using a sub-image size of 10×10 pixies, we obtain the binarized image 122 shown in FIG. 21B.

Figure 22A:
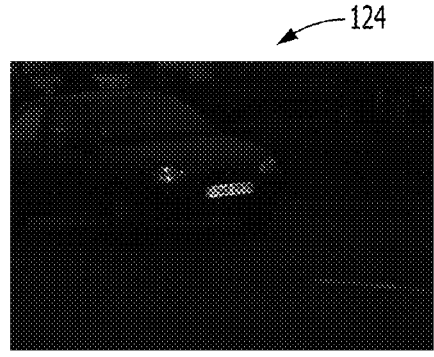
FIGS. 22A and 22B are a grayscale image and its corresponding binarized image respectively, the latter having been obtained with dynamic sub-image division in accordance with a non-restrictive illustrative embodiment of the present disclosure.
Figure 22B:
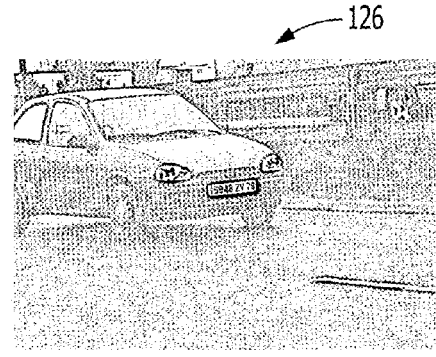
Figure 23A:
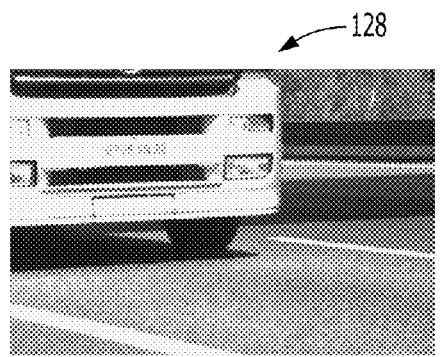
FIGS. 23A and 23B are a grayscale image and its corresponding binarized image respectively, the latter having been obtained with dynamic sub-image division in accordance with a non-restrictive illustrative embodiment of the present disclosure.
Figure 23B:
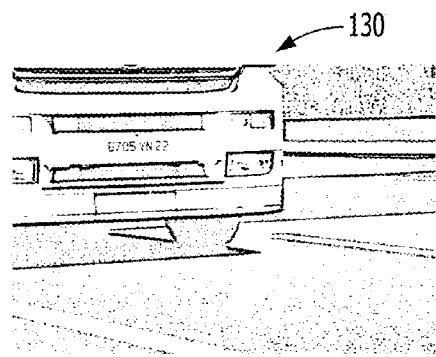

FIGS. 22A and 23A are also grayscale images 124 and 126 respectively having an image width of 702 pixels and an image height of 479 pixels, their corresponding binarized images, 128 and 130, respectively shown in FIGS. 22B and 23B were obtained with sub-image sizes of 10×10 pixels.

About Small Size Characters

To get good characters quality suitable for OCR recognition, the size of characters in the image to be binarized should preferably not be too small. If the size of the characters on a car plate, for example, is too small and the contrast of foreground and background is also too small, the result of binarization may not be optimal as shown in the examples of FIG. 24.

About the Sub-Image Size

Generally, the result of binartization is not very sensitive to the sub-image size. However, when character size is small, the result becomes more sensitive to the sub-image size.

As was previously discussed, the width of the characters in most of car plate images is about 12 pixels, the sub-image width we set, in accordance with an illustrative embodiment was 18 pixels (1.5 times of the character width).

Turning to FIG. 25, a car plate grayscale image 200 is shown, having a character width of 7 pixels. A sub-image size of 1.5 times the character width was used (10.5×10.5 pixels) which resulted in a binarized image 202. Another binarized image 204 was produced using a sub-image size of 10×10 pixels. This second image 204 was superior to image 202.

Time

The amount of time for binarizing an image is dependent on the sub-image size; the larger the size is the more time the binarization consumes. In one embodiment, it takes almost 1 second when binarizing a whole car image with a sub-image width and height of 10 pixels. It is possible to improve binarization time consuming by finding an optimal sub-image size as disclosed above.

The algorithms disclosed herein are easy to implement, and the results provide images that are suitable for OCR recognition.

The binarization result is not very sensitive on the sub-image size, but the sub-image size does affect the binarization result when the characters in the images are too small. It also affects the result on big black masses. For big black masses, the result will be better if the sub-image size is not smaller than the masses size.

In accordance with an illustrative embodiment of the present disclosure, there is also provided a device for performing the methods disclosed herein. This device can include a controller for performing steps of the methods disclosed herein as well as a scanner and/or digital image input and/or video input to acquire the grayscale photographs or video images, and an interface for displaying results and/or a printer. For example, the controller can be a data processor such as a computer, the interface can be a screen.

It should be noted that the various components and features of the embodiments described above can be combined in a variety of ways so as to provide other non-illustrated embodiments within the scope of the disclosure.

It is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been described hereinabove by way of embodiments thereof, it can be modified, without departing from the spirit, scope and nature of the subject disclosure.

What is claimed is:

1. A method of binarizing a grayscale image into a black and white binary image, said method comprising:
    selecting a given pixel (P) in the grayscale image;
    determining the color value ($V_p$) of P;
    providing a sub-image ($SubI_p$) comprising P as well as a number of neighboring pixels;
    providing a threshold ($T_p$) of P based on the color values of all the pixels in $SubI_p$;
    converting P to black if $V_p \leq T_p$ or to white if $V_p > T_p$;
    repeating the above steps for each pixel of the grayscale image; and
    obtaining a resulting black and white binarized image,
    wherein the number of pixels in each $SubI_p$ is set by performing the steps of the method on a representative sample set of grayscale images with various values of $SubI_p$ in the range 0.5 to 1.5 times the average character size of the representative sample set of grayscale images.

2. A method according to claim 1, wherein the given pixel P is positioned in the centre of the $SubI_p$.

3. A method according to claim 1, wherein $T_p$ is calculated by:
    determining the average color value (Ap) of all the pixels in $SubI_p$; and
    multiplying Ap by a threshold coefficient (C) to get $T_p$.

4. A method according to claim 3, wherein C is determined by performing the steps of the method on a representative sample set of grayscale images with various values of C in a range of 0.8 to 1.2 in order to determine an optimal value of C.

5. A method according to claim 1, wherein $T_p$ is calculated by:
    separating all pixels in $SUbI_p$ into a first cluster and a second cluster based on their color value using a two-means clustering algorithm;
    calculating means of the color value of the pixels in the first cluster ($M_{C1}$) and in the second cluster ($M_{C2}$); and
    calculating the mean of $M_{C1}$ and $M_{C2}$ to get $T_p$.

6. A method according to claim 1, wherein the height and the width of the grayscale image are H and W respectively, the position of P being ($x_p$, $y_p$) with $x_p$ being a position along W and a $y_p$ being a position along H, the sub-image $SubI_p$ having a height Hs which is a portion of H and a width Ws which is a portion of W, and defining a left border ($l_p$) and a right border ($r_p$) positioned along W, and a top border ($t_p$) and bottom border ($b_p$) positioned along H.

7. A method according to claim 6, wherein the position of the left border (lP) is calculated as follows:

$$l_P = \begin{cases} 0, & \text{if } 0 \leq x_P < W_S/2; \\ x_P - W_S/2, & \text{if } W_S/2 \leq x_P < W - W_S/2; \\ W - W_S/2, & \text{if } W - W_S/2 \leq x_P < W; \end{cases}$$

8. A method according to claim 6, wherein the position of the top border (tp) is calculated as follows:

$$t_P = \begin{cases} 0, & \text{if } 0 \leq y_P < H_S/2; \\ y_P - H_S/2, & \text{if } H_S/2 \leq y_P < H - H_S/2; \\ H - H_S/2, & \text{if } H - H_S/2 \leq y_P < H; \end{cases}$$

9. A method according to claim 6, wherein the position of the top border ($r_p$) is calculated as follows:

$$r_P = \begin{cases} W_S, & \text{if } 0 \leq x_P < W_S/2; \\ x_P + W_S/2, & \text{if } W_S/2 \leq x_P < W - W_S/2; \\ W, & \text{if } W - W_S/2 \leq x_P < W; \end{cases}$$

10. A method according to claim 6, wherein the position of the bottom border ($b_p$) is calculated as follows:

$$b_P = \begin{cases} H_S, & \text{if } 0 \leq y_P < H_S/2; \\ y_P + H_S/2, & \text{if } H_S/2 \leq y_P < H - H_S/2; \\ H, & \text{if } H - H_S/2 \leq y_P < H; \end{cases}$$

11. A method of binarizing a grayscale image into a black and white binary image said method comprising:
    selecting a given pixel (P) in the grayscale image;
    determining the color value (VP) of P;

providing a sub-image (SubIP) comprising P as well as a number of neighboring pixels;
providing a threshold (TP) of P based on the color values of the pixels in SubIP;
converting P to black if VP≤TP or to white if VP>TP;
repeating the above steps for each pixel of the grayscale image; and
obtaining a resulting black and white binarized image,
wherein said grayscale image comprises a border surrounding characters, said method further comprising:
   obtaining a first and second binary image, wherein one of said first and second binary images provides a clear border and the other of the first and second binary images provides clear characters;
   combining the first and second binary images to obtain a combined binary image providing for both a clear border and clear characters;
   removing the border in the binary image with clear characters to provide a binary image without a border;
   combining the binary image without a border with the binary image providing a clear border so as to obtain the combined binary image having both a clear border and clear characters,
wherein removing the border comprises:
finding the border contour on the binary image providing a clear border, wherein the binary image providing a clear border comprises top, bottom, left and right borders;
mapping the found border contour on the binary image Providing clear characters; and
painting white the mapped border contour on the binary image providing clear characters.

12. A method according to claim 11, wherein one of the first and second images is obtained by using a sub-image size containing a given number of pixels and the other of said first and second binary images is obtained by using another sub-image size containing a different number of pixels.

13. A method according to claim 11, wherein the one of the first and second images that provides a clear border is obtained with a sub-image comprising more pixels than the other of the first and second binary images that provides for clear characters.

14. A method of binarizing a grayscale image into a black and white binary image, said method comprising:
selecting a given pixel (P) in the grayscale image;
determining the color value (VP) of P;
providing a sub-image (SubIP) comprising P as well as a number of neighboring pixels;
providing a threshold (TP) of P based on the color values of all the pixels in SubIP;
converting P to black if VP≤TP or to white if VP>TP;
repeating the above steps for each pixel of the grayscale image; and
obtaining a resulting black and white binarized image,
wherein said grayscale image comprises a border surrounding characters, said method further comprising:
   obtaining a first and second binary image, wherein one of said first and second binary images provides a clear border and the other of the first and second binary images provides clear characters; and
   combining the first and second binary images to obtain a combined binary image providing for both a clear border and clear characters,
wherein the one of the first and second images that provides a clear border is obtained with a sub-image comprising more pixels than the other of the first and second binary images that provides for clear characters,
wherein finding the border comprises:
obtaining the height H and width W of the binary image providing a clear border;
providing horizontal and vertical border density coefficients $C_h$, and $C_v$ respectively; and
identifying in the binary image providing a clear border:
   the line number ($B_t$) of a pixel line in the top border having a line black density value that is less than $W \times C_h$;
   the line number ($B_b$) of a pixel line in the bottom border having a line black density value that is less than $W \times C_h$;
   the column number ($B_l$) of a pixel column in the left border having a line black density value that is less than $H \times C_v$;
   the column number ($B_r$) of a pixel column in the right border having a line black density value that is less than $H \times C_v$;
thereby providing the border positions $B_t$, $B_b$, $B_l$, and $B_r$.

15. A method according to claim 14, wherein the values of $S_h$, $S_v$, $C_h$ and $C_v$ are determined by executing the claimed method on a representative sample set of grayscale images with various values of $S_h$, $S_v$, $C_h$ and $C_v$ in order to determine optimal values for the sample set.

16. A method according to claim 14, wherein the position of a pixel P in the binary image providing a clear border is ($x_p$, $y_p$), wherein $x_p$ is a pixel column position along W and $y_p$ is a pixel line position along H, wherein finding the border contour comprises:
identifying in the binary image providing a clear border:
   the first black pixel in each vertical pixel column from the column position at $x_p=B_l$ to $x_p=B_r-1$ within the top border area defined from the position $y_p=B_t$ to $y_p=0$ thereby providing the top border contour $E_t$;
   the first black pixel in each vertical pixel column from the column position at $x_p=B_l$ to $x_p=Br-1$ within the bottom border area defined from the position $y_p=B_b$ to $y_p=H-1$ thereby providing the bottom border contour $E_b$;
   the first black pixel in each vertical pixel line from the line position at $y_p=B_t$ to $y_p=B_b-1$ within the left border area defined from the position $x_p=B_l$ to $x_p=0$, thereby providing the left border contour $E_l$; and
   the first black pixel in each vertical pixel line from the line position at $y_p=B_t$ to $y_p=B_b-1$ within the right border area defined from the position $x_p=B_r$ to $x_p=W-1$ thereby providing the right border contour $E_r$.

17. A method according to claim 16, wherein painting white the mapped border contour on the binary image providing clear characters comprises:
mapping the top, bottom, left and right border contours $E_t$, $E_b$, $E_l$, and $E_r$ on the binary image providing clear characters;
painting white every pixel in the top border contour $E_t$ as well as all the pixels in the same column with and above each pixel in the top border contour $E_t$;
painting white every pixel in the bottom border contour $E_b$ as well as all the pixels in the same column with and below each pixel in the bottom border contour $E_b$;
painting white every pixel in the left border contour $E_l$ as well as all the pixels in the same line with and to the left of each pixel in the left border contour $E_l$ and
painting white every pixel in the right border contour $E_r$ as well as all the pixels in the same line with and to the right of each pixel in the right border contour $E_r$.

18. A method according to claim 1, further comprising the step of applying a border removal procedure to the binarized image.

19. A device for binarizing a grayscale image into a black and white binary image, said device comprising:
- an input for receiving the grayscale image; and
- a controller operatively connected to the input, the controller being so configured so as to perform the steps of:
  - selecting a given pixel (P) in the grayscale image;
  - determining the color value ($V_p$) of P;
  - providing a sub-image ($SubI_p$) comprising P as well as a number of neighbouring pixels;
  - providing a threshold ($T_p$) of P based on the color values of all the pixels in $SubI_p$;
  - converting P to black if $V_P \leq T_p$ or to white if $V_p > T_p$;
  - repeating the above steps for each pixel of the grayscale image; and
  - providing a resulting black and white binarized image,
  - wherein the number of pixels in each $SubI_p$ is set by performing the controller steps on a representative sample set of grayscale images with various values of $SubI_p$ in the range 0.5 to 1.5 times the average character size of the representative sample set of grayscale images.

20. A device for binarizing a grayscale image into a black and white binary image, said device comprising:
- an input for receiving the arm/scale image; and
- a controller operatively connected to the input, the controller being so configured so as to perform the steps of:
  - selecting a given pixel (P) in the grayscale image;
  - determining the color value ($V_p$) of P;
  - providing a sub-image ($SubI_p$) comprising P as well as a number of neighbouring pixels;
  - providing a threshold ($T_p$) of P based on the color values of all the pixels in $SubI_p$;
  - converting P to black if $V_p \leq T_p$ or to white if $V_p > T_p$;
  - repeating the above steps for each pixel of the grayscale image; and
  - providing a resulting black and white binarized image,
  - wherein $T_p$ is calculated by:
    - determining the average color value (Ap) of all the pixels in $SubI_p$; and
    - multiplying Ap by a threshold coefficient (C) to get $T_p$;
  - wherein C is determined by performing the controller steps on a representative sample set of grayscale images with various values of C in a range of 0.8 to 1.2 in order to determine an optimal value of C.

21. A device according to claim 19, wherein $T_p$ is calculated by:
- separating all pixels in $SubI_p$ into a first cluster and a second cluster based on their color value using a two-means clustering algorithm;
- calculating means of the color value of the pixels in the first cluster ($M_{C1}$) and in the second cluster ($M_{C2}$); and
- calculating the mean of $M_{C1}$ and $M_{C2}$ to get $T_p$.

22. A method of binarizing a grayscale image into a black and white binary image, said method comprising:
- selecting a given pixel (P) in the grayscale image;
- determining the color value ($V_P$) of P;
- providing a sub-image ($SubI_p$) comprising P as well as a number of neighboring pixels;
- providing a threshold ($T_p$) of P based on the color values of all the pixels in $SubI_p$;
- converting P to black if $V_P \leq T_p$ or to white if $V_p > T_p$;
- repeating the above steps for each pixel of the grayscale image; and
- obtaining a resulting black and white binarized image, wherein $T_p$ is calculated by:
  - determining the average color value (Ap) of all the pixels in $SubI_p$; and
  - multiplying Ap by a threshold coefficient (C) to get $T_p$,
  - wherein C is determined by performing the steps of the method on a representative sample set of grayscale images with various values of C in a range of 0.8 to 1.2 in order to determine an optimal value of C.

* * * * *